(12) United States Patent
Boyes et al.

(10) Patent No.: US 11,200,767 B2
(45) Date of Patent: Dec. 14, 2021

(54) METHOD AND SYSTEM FOR ENHANCING SECURITY OF A SECURED AREA

(71) Applicant: Sensormatic Electronics, LLC, Boca Raton, FL (US)

(72) Inventors: Derek Joseph Boyes, Aghalee (GB); Terence Neill, Lisburn (GB)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/700,842

(22) Filed: Dec. 2, 2019

(65) Prior Publication Data

US 2021/0166514 A1    Jun. 3, 2021

(51) Int. Cl.
*G07C 9/15* (2020.01)
*G07C 9/00* (2020.01)
*G06K 9/00* (2006.01)
*G07F 19/00* (2006.01)

(52) U.S. Cl.
CPC ........... *G07C 9/15* (2020.01); *G06K 9/00771* (2013.01); *G07C 9/00* (2013.01); *G07C 9/00563* (2013.01); *G07F 19/207* (2013.01)

(58) Field of Classification Search
CPC ........ G07C 9/15; G07C 9/00771; G07C 9/00; G07C 9/00563; G07F 19/207
See application file for complete search history.

(56) References Cited

U.S. PATENT DOCUMENTS

| 2004/0153671 | A1* | 8/2004 | Schuyler | G07C 9/00 726/9 |
| 2017/0221289 | A1* | 8/2017 | Trani | H04W 4/33 |
| 2017/0300758 | A1* | 10/2017 | Renkis | G06K 9/00979 |
| 2019/0147676 | A1* | 5/2019 | Madzhunkov | G06K 9/00255 340/5.2 |
| 2020/0105081 | A1* | 4/2020 | Huang | G07C 9/37 |

* cited by examiner

*Primary Examiner* — Nabil H Syed
(74) *Attorney, Agent, or Firm* — Arent Fox LLP

(57) ABSTRACT

A computer device for enhancing security of a secured area that comprises a video input device and a processor configured to receive a request to access the secured area at an access point associated with the secured area, obtain an image data of a secure boundary area associated with the access point, determine the number of users in the secure boundary area based on the image data, determine whether to grant an access in response to the request based on one or more rules, grant the access in response to the request in accordance with the rules when the number of users in the secure boundary area is less than or equal to a threshold, and deny the access in response to the request in accordance with the rules and when the number of users in the secure boundary area is greater than the threshold.

20 Claims, 3 Drawing Sheets

METHOD AND SYSTEM FOR ENHANCING SECURITY OF A SECURED AREA

TECHNICAL FIELD

The disclosure relates generally to the field of security systems, and more particularly to a system and a method for enhancing security of a secured area.

BACKGROUND

One of the issues with access control systems relates to tailgating i.e., seeking access by following a person having access. In this situation, when a person gains access to a building and, as they enter, another person (who may or may not have legitimate access to the building) follows closely behind and gains access to the building without their presence being recorded by the access control system. This may compromise the security provided by the access control system.

Existing systems try to solve the issue by counting the number of people who went through the access control gateway. However, such a solution is reactive rather than proactive. For example, the system detects a tailgating person when the access controlled checkpoint has been crossed, or when the tailgating person is at the access controlled checkpoint itself. Thus, such systems are suboptimal in preventing tailgating, and do not provide adequate security at the access control system.

Access to sensitive and secured areas such as a building, a specific room in the building, an ATM (Automated Teller Machine), or a hazardous site, or a hazardous machine can lead to security breaches with severe consequences. Therefore, improvements in access control systems are desired.

SUMMARY

In view of the forgoing, a system and method are disclosed for enhancing security of a secured area.

The system and method may allow a video input device to monitor a secure boundary area around associated with an access point. The access point may be the point of entry of the secured area where a user requesting access requests access to the secured area. The video input device captures the image data of the secure boundary area. Based on the image data captured by the video input device, the number of users in the secure boundary area may be determined. When the number of users in the secure boundary area is greater than a threshold (for example, greater than one, the system and method may deny an access to an access request received at an access point of the secure boundary area. When the number of users in the secure boundary area is less than or equal to the threshold (for example equal to one), the system and method may further determine to grant the access to the access request or deny the access request based on one or more rules.

In an exemplary embodiment, the system and method may determine whether to grant the access by verifying the identity of a user making the request using a verification technique. Upon a successful verification of the user by the verification technique, the system and method may grant the access. Upon an unsuccessful verification of the user by the verification technique, the system and method may deny the access.

In an exemplary embodiment, the system and method may determine the number of users using a video analytics technique.

In an exemplary embodiment, the system and method may determine the number of users in the secure boundary area using a biometric verification technique.

In an exemplary embodiment, the system and method may determine to grant the access based on an event or an exception request received at a security control system and the grant of the exception request.

In an exemplary embodiment, the system and method may determine to grant the access when the number of users present in the secure boundary area is greater than the threshold along with generation of a warning for output at the access point.

In an exemplary embodiment, the system and method may determine to grant the access based on verifying each of the users in the secure boundary area using a verification technique such as a biometric technique. Upon a successful verification of each of the users in the secure boundary area the access may be granted. Upon an unsuccessful verification of at least one of the users in the secure boundary area the access may be denied.

In an exemplary embodiment, the system and method may output an indication at the access point providing the reason for denial on a display device at the access point.

In an exemplary embodiment, the secured area may be a building, an area inside any building, an ATM (automated teller machine) housing, an enclosure for a site, or an enclosure for an equipment.

In an exemplary embodiment, the system and method may generate an instruction to disable the operation of an equipment located inside the secured area based on determining that the number of users in the secure boundary area is greater than the threshold.

BRIEF DESCRIPTION OF THE DRAWINGS

By way of example, specific embodiments of the disclosed system (computer device) and the method will now be described, with reference to the accompanying drawings, in which.

DETAILED DESCRIPTION

Figure 1:
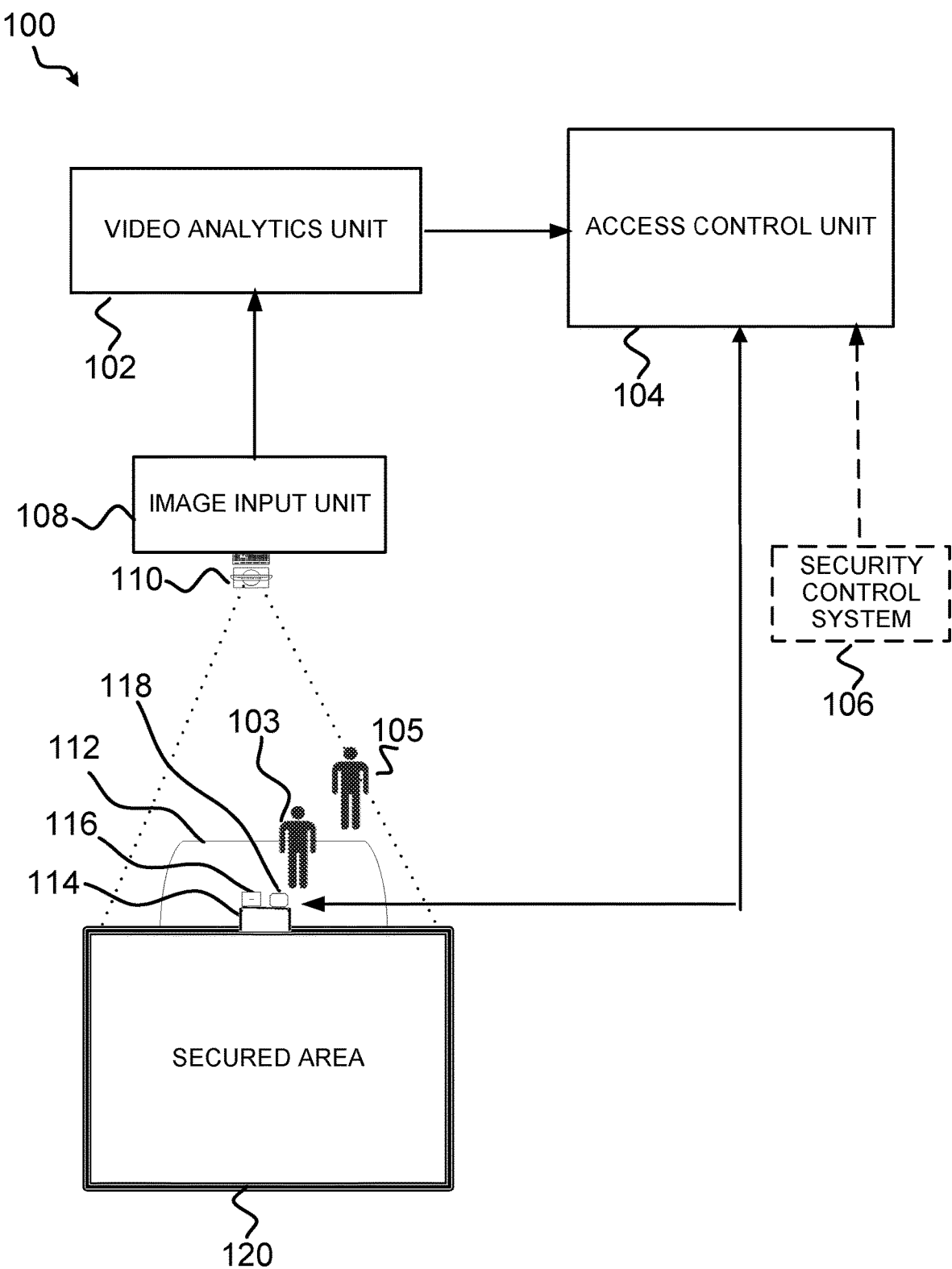
FIG. 1 is a block diagram of a secured area and an access control system to enhance the security of a secured area.

As discussed above, various flaws exist in access control systems designed to authenticate users at an access point using one or more verification techniques, such as ID (Identity Card) reader, fingerprint reader, retina scan, RFID (Radio Frequency Identification Tag reader), password, alpha/numeric/alphanumeric key code, etc. Such flaws include not being able to detect trailing (tailgating) unauthorized users trying to gain access by closely following an authorized user.

To this end, a system (computer device) and a method for enhancing the security of a secured area in accordance with the present disclosure will now be described more fully hereinafter with reference to the accompanying drawings. In some examples, the system and method may be used at the time an access control system or the access point is set up for the first time. In other examples, the system or method may be installed at a later time, for example during service of an access point or upgrading the access point.

For example, the present disclosure includes a proactive system that preventively detects and deters tailgating at secured locations, which can significantly improve the safety, security and integrity of access control systems. In one implementation, the solution includes defining a secure boundary area around an area to be secured. The solution comprises using a video input device (e.g., a camera) to monitor the secure boundary area and using analytics to identify a number of people in the secure boundary area. The access control system can be configured to only allow a single person to access the secured at a time based on the analytics and image data received from the video input device.

Furthermore, the disclosed system and method may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

It will be appreciated that the method for enhancing the security of a secured area may be implemented for virtually any type of secured areas including a first building, an area inside any building, an ATM (automated teller machine) housing, an enclosure for a site, an enclosure for an equipment, etc., or any combination thereof. Further, the access control technique utilized at an access point of the secured area may be any of different verification techniques including digital (password, key code, etc.), analog (voice recognition, manual locks, etc.), or biometric (retina scan, face recognition, etc.).

Referring to FIG. 1, an access control system 100 identifies a number of objects, such as people/individuals, within a secure boundary area 112 of an access point 114 to a secured area 120 to limit or detect unauthorized individuals from tailing or tailgating authorized individuals to gain access to the secured area 120. In an implementation, the access control system 100 may include a video analytics unit 102 that receives an image, which may include a first user 103 and/or a second user 105, of the secure boundary area 112 from a camera 110 and a image input unit 108. The access control system 100 may also include an access control unit 104 that receives identification of one or more individuals from a video analytics unit 102 based on the image, and that also receives access information (e.g., associated with the first user 103 and/or the second user 105) from a verification interface 116 of the access point 114. Optionally, the access control system 100 may include a security control system 106 that may provide other access decision-related information to the access control unit 104. The access control unit 104 evaluates the inputs and provides an access control command to the access point 114 to allow or deny access to the secured area 120. In some cases, the access point 114 may include a feedback unit 118, such as a display and/or a speaker, to provide an indication to an individual requesting access, such as the first user 103, as to the access control decision made by the access control unit 104. Thus, by basing access to the secured area 120 at least in part on a number of authorized individuals in the secure boundary area 112 adjacent to the access point 114, the access control system 100 may provide enhanced security and reduce or eliminate access by unauthorized individuals that trail or tailgate authorized individuals.

More specifically, the secured area 120 represents the area to be secured. For example, the secured area 120 may be a building, an area inside any building, an ATM (automated teller machine) housing, an enclosure for a site such as an hazardous site, or an enclosure for an equipment. The access point 114 represents the gateway to the access the secured area, such as a lockable door, a lockable gate or fence, etc. The access point 114 may include the verification interface 116, the feedback unit 118, and/or one or more input/output interfaces. For example, the verification interface 116 may be a digital verification interface that may ask for a user to enter a key code or a password. In some cases, the verification interface 116 may be an analog interface, such as a manual lock, etc. The verification interface 116 may be a biometric verification interface such as a facial recognition system, a retina scanning system, etc. The type and design of the verification interface 116 may depend on the type of verification technique used to authenticate a user. The feedback unit 118 may be one of or a combination of an LCD (Liquid Crystal Display), and LED (Light Emitting Diode) display, a speaker configured to provide audio feedback, or the like. The feedback unit 118 may prompt a user to provide their credentials for the respective verification technique utilized at the access point. The feedback unit 118 may also display to the user whether the user has been successfully verified, whether the user's verification was unsuccessful, or display a warning to the user.

The secure boundary area 112 represents an area associated with the access point 114. The secure boundary area 112 may form a periphery around the access point 114. The secure boundary area 112 may have any size or shape configured to provide sufficient distance between the access point 114 and an unauthorized individual attempting to gain access to the access point 114 by trailing or tailgating an authorized individual as they are entering the access point 114. Such a sufficient distance may vary depending on the implementation or the entity controlling the access control system 100. For instance, the secure boundary area 112 may include a shape such as, but not limited to, elliptical, oval, circle, square, triangle, quadrilateral, pentagonal, hexagonal, etc. The secure boundary area 112 may or may not be a physically demarcated area, but in any case is an area used by the access control unit to define a periphery around the access point 114 to prevent tailgating users from gaining access to the secured area 120 through the access point 112.

The camera 110 monitors the secure boundary area 112 and provides the image data to the image input unit 108. For example, the camera 110 may be any type of image sensor. The image input unit 108 is coupled to the video analytics unit 102. The image input unit 108 may include one or more image processing techniques to make the image data captured by the camera 110 to be in a standardized format to be analyzed/processed by the video analytics unit 102. The video analytics unit 102 is coupled to the access control unit 104 and provides processed information from the image data to the access control unit 104. For example, the video analytics unit 102 may utilize one or more facial recognition techniques to determine the number of users in the secure boundary area 112 from the input received from the image input unit 108. The video analytics unit 102 may also include instructions for determining the periphery of the secure boundary area 112 in order to determine whether a detected individual in an image is within or outside of the secure boundary area 112. The video analytics unit 102 processes the input from the image input unit 108 and determines the number of users in the secure boundary area 112 at any desired time. For example, the video analytics unit 102 may continuously monitor the secure boundary area 112 or may begin monitoring the secure boundary area 112 when a request to access is received from a user (e.g., the first user 103 at the access point 114).

The access control unit 104 may be coupled to the access point 114 and may decide whether to grant a request to access or deny the request to access when such a request is received at the access point 114. For example, when the first user 103 makes a request to access the secured area at the access point 114, the access control unit 104 determines whether to grant access in response to the request or deny the request. The access control unit 104 may make the determination about granting the request or denying the request based on one or more rules (as described in more detail in the description of block 208 of FIG. 2), and/or based on the information (such as the number of users in the secure boundary area 112) received from the video analytics unit 102.

The access control unit 104 may also be coupled to the security control system 106, which may be used to monitor, provide inputs to, receive outputs from, or control the operations of the access control unit 104. For example, in response to the first user 103 providing proper credentials and identifying the second user 105 (who is unauthorized) as a guest, the security control system 106 may generate an exception to grant access even when the second user 105 is with the secure boundary area 112 monitored by the camera 110. The security control system 106 may grant exceptions in several circumstances including a special event, a manual override by a security guard monitoring the security control system 106, etc.

The access control unit 104 may selectively grant access to a user (e.g., the first user 103) making a request to access the secured area 120 in order to prevent a tailgating user (e.g., the second user 105). For example, the access control unit 104 may grant the access request of the first user 103 when the second user 105 is not within the secure boundary area 112. The access control unit 104 may deny the access request of the first user 103 when the second user 105 is within the secure boundary area 112. The operational details and different conditions under which the access control unit 104 may grant or deny access to a user (e.g., the first user 103) making a request at the access point 114 are explained in further detail in the flow diagram of FIG. 2.

Figure 2:
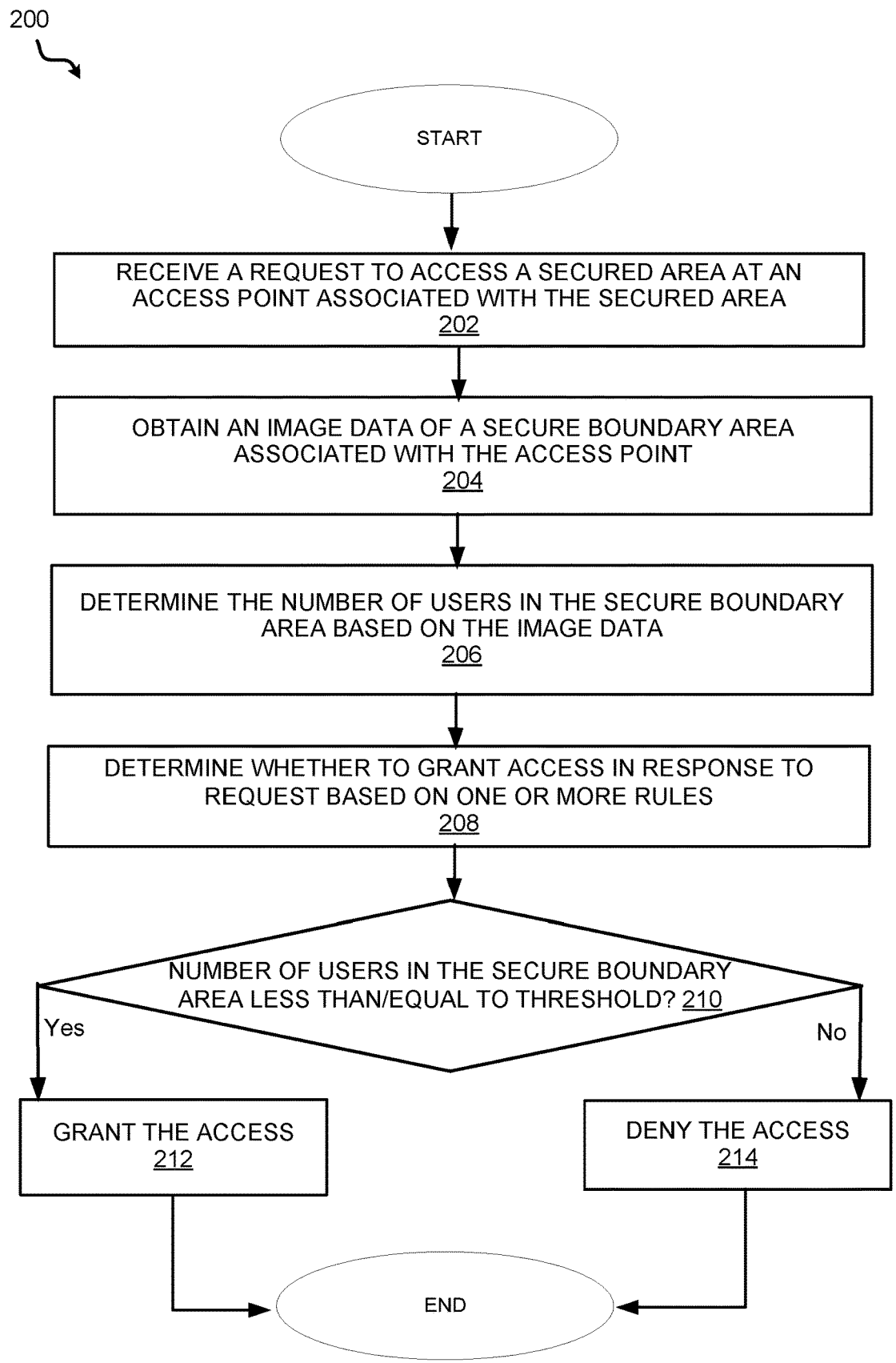
FIG. 2 is a flow diagram for an exemplary method for enhancing the security of a secured area.

Referring to FIG. 2, an exemplary method 200 for enhancing the security of a secured area includes various actions that may be performed by one or more components of the access control system 100 (FIG. 1).

At block 202, the method 200 includes receiving a request to access a secured area at an access point associated with the secured area. For example, a request to access the secured area 120 may be received at the access point 114 as described in FIG. 1. In one implementation, the verification interface 116 may receive the request to access the secured area 120 from the first user 103. The request from the first user may be based on a tapping of an RFID card, a key code, input of a password, etc. depending on the verification techniques used at the verification interface 116 of the access point 114 (as described in FIG. 1).

At block 204, the method 200 includes obtaining image data of a secure boundary area associated with the access point. For example, the camera 110 may obtain the image data of the secure boundary area 112. The camera 110 may supply the image data to the image input unit 108. The image data may include the number of users present in the secured boundary area 112. The image data may include details of one or more users in the secure boundary area 112, such as the facial details of the users, any identification marks, barcodes, or QR (Quick Reference codes) worn by the users, etc. The camera 110 obtains the image data and supplies the image data to the image input unit 108. The image input unit 108 may process the image data using one or more image processing techniques (such as facial recognition technique, bar code identification technique, QR code identification technique), etc. The image input unit 108 may provide the processed image data to the video analytics unit 102.

At block 206, the method 200 includes determining a number of users in the secure boundary area based on the image data. For example, the video analytics unit 102 determines the number of users in the secure boundary area 112. In one implementation, the video analytics unit 102 determines the number of users in the secure boundary area based on a biometric identification technique, such as facial recognition technique. In addition to determining the number of users in the secure boundary area, the video analytics unit 102 may also determine the identity of users present in the secure boundary area. The video analytics unit 102 may determine the identity of the users based on scanning one or more identification techniques such as facial recognition technique, code identification (bar code, QR code, etc.) technique, etc. The video analytics unit 102 may also correlate the identity of the users in the secure boundary area 112 with one or more identifiers stored in a database and determine for each of the users present in the secure boundary area whether the users are authorized to access the secured area 120 or not. The video analytics unit 102 may forward the results of such determination to the access control unit 104.

At block 208, the method 200 includes determining whether to grant access in response to the request based on one or more rules. For example, the access control unit 104 determines whether to grant access to the request received at block 202.

In one implementation, the access control unit 104 determines to grant access merely based on the identity of the user making the request (i.e., the first user 103). For example, the first user 103 may be the owner of a building, or an overriding user who is always allowed access to the secured area irrespective of the number of users present in the secure boundary area 120.

In another implementation, the access control unit 104 determines to grant access based on a specified event. For example, if one a particular day and time, access is to be granted to a building, or an area of the building for a conference/public event, the access control unit 104 grants access based on such an event. Also, the security control system 106 (whether manually controlled by an operator/security guard or programmed to execute certain instructions) may specify an exception and direct the access control unit 104 to grant the access. For example, the security control system 106 may specify the exception to the access control unit 104 based on an exception request from the first user 103 at the access point 114 and the grant of the exception request by the security control system 106 (whether manually controlled by the operator/security guard or programmed to execute certain instructions).

In another implementation, the access control unit 104 may grant access in response to the request (received at block 202), irrespective of the number of users present in the secure boundary area 112, and generate a warning to be displayed at the feedback unit 118 of the access point. The warning may specify to the first user 103 that though access is being granted, the first user 103 may be aware of other users in vicinity of the first user 103 who may attempt to tailgate in order to gain access to the secured area 120.

In another implementation, the access control unit 104 may determine (for example based on the input from the video analytics unit 102) that there are multiple users present in the secure boundary area 112. For example, the second user 105 also being within the secure boundary area 112. The access control unit 104 may further determine that each of the users in the secure boundary area 112 (i.e., the first user 103 and the second user 105) are authorized to access the secured area 120. The access control unit 104 may determine that each of the users in the secure boundary area 112 are authorized access to the secured area 120 based on verifying the identity of the users against a database stored at the access control unit 104, or based on information received from the video analytics unit 102. The access control unit 104 may grant access to the request received at block 202, upon verifying that each of the users in the secure boundary area 112 are authorized to access the secured area 120, irrespective of the number of users present in the secure boundary area 112. The access control unit 104 may deny access to the request received at block 202, upon verifying that not all of the users in the secure boundary area 112 are authorized to access the secured area 120.

At block 210, the method 200 includes determining whether the number of users in the secure boundary area is less than or equal to a threshold. For example, the access control unit 104 determines that the number of users in the secure boundary area 120 is less than or equal to the threshold. In one implementation, the value of threshold may be 1. In another implementation, the value of threshold may be more than one (in a circumstance where it is fine to allow multiple users accompanying an authorized user access to the secured area 120). When the access control unit 104 determines that the number of users in the secure boundary area 112 is less than or equal to the threshold, the control flows to block 212. When the access control unit 104 determines that the number of users in the secure boundary area 112 is greater than the threshold, the control flows to block 214.

At block 212, the method 200 includes granting access in response to the request. For example, the access control unit 104 grants access to the request at block 202. The grant access at block 212 represents access grant in combination with one or more of the conditions specified by the one or more rules (as described at block 208).

At block 214, the method 200 includes denying access in response to the request. For example, the access control unit 104 denies access to the request at block 202. The deny access at block 214 represents access denial in combination with one or more of the conditions specified by the one or more rules (as described at block 208).

In one implementation, when the access control unit 104 denies access in response to the request, the access control unit 104 may generate an instruction for the feedback unit 118 to display the reason for denial of access to the access point 114.

In another implementation, when the secured area 120 includes an equipment located inside the secured area 120, the access control unit 104 may generate any instruction to disable the operation of the equipment inside the secured area, upon determining that the access request received at block 202 be denied. The access control unit 104 may generate such an instruction alone or in combination with denial of request to access the secured area 120.

Upon determining whether to grant the access at block 212, or to deny the access at block 214, the operation flow of the flow diagram in FIG. 2 may be repeated for another request to access the secured area 120 at the access point 114. Further, the order of operations in the flow diagram of FIG. 2 is merely illustrative. One or more operations may be performed standalone, in combination with, or in a different order from the description of FIG. 2.

Figure 3:
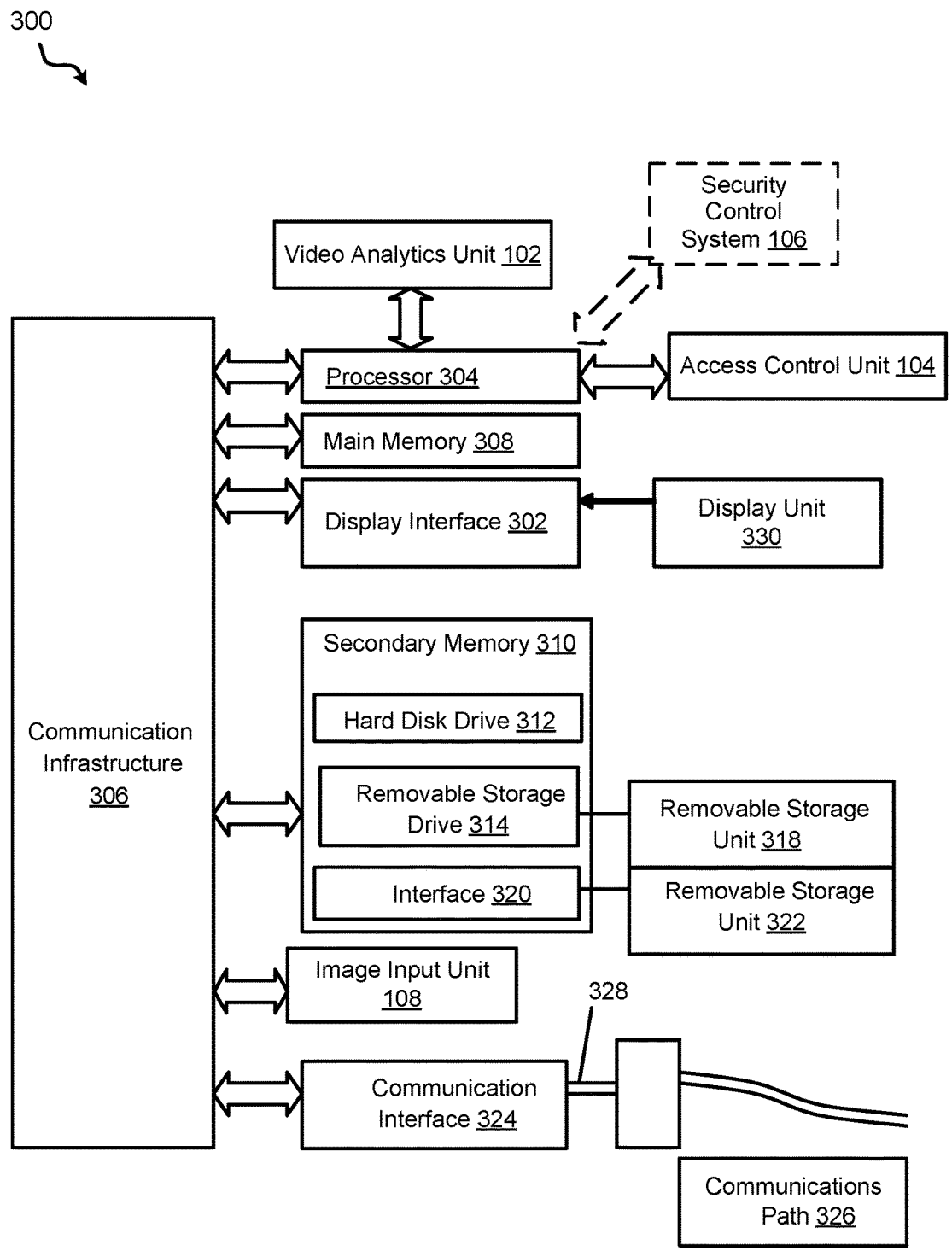
FIG. 3 is a system diagram of a computer device operable to enhancing the security of a secured area in accordance with the present disclosure.

Referring to FIG. 3, an example of a computer device 300 operable for enhancing the security of a secured area may include a set of components configured in accordance with the present disclosure. Computer device 300 includes one or more processors, such as processor 304. The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer device 300 may include a display interface 302 that forwards graphics, text, and other data from the communication infrastructure 306 (or from a frame buffer not shown) for display on a display unit 330. Computer device 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data.

The computer device 300 also includes the video analytics unit 102, the image input unit 108, the access control unit 104, and may also include the security control system 106 interfaced to the processor 304 of the computer device 300. The video analytics unit 102, the image input unit 108, the access control unit 104, and the security control system 106 have similar functions as described in FIG. 1. The processor 304 of the computer device 300 may be coupled to the video analytics unit 102, the access control unit 104, and the image input unit 108 and may perform one or more operations by processing the instructions stored in the respective units to perform the operations of the respective unites as described in FIGS. 1 and 2.

Alternative aspects of the present disclosure may include secondary memory 310 and may include other similar devices for allowing computer programs or other instructions to be loaded into computer device 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer device 300.

Computer device 300 may also include a communications interface 324. Communications interface 324 allows software and data to be transferred between computer device 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 318, a hard disk installed in hard disk drive 312, and signals 328. These computer program products provide software to the computer device 300. Aspects of the present disclosure are directed to such computer program products.

Computer programs (also referred to as computer control logic) are stored in main memory 308 and/or secondary memory 310. Computer programs may also be received via communications interface 324. Such computer programs, when executed, enable the computer device 300 to perform the features in accordance with aspects of the present disclosure, as discussed herein. In particular, the computer programs, when executed, enable the processor 304 to perform the features in accordance with aspects of the present disclosure. Accordingly, such computer programs represent controllers of the computer device 300.

In an aspect of the present disclosure where the disclosure is implemented using software, the software may be stored in a computer program product and loaded into computer device 300 using removable storage drive 314, hard drive 312, or communications interface 320. The control logic (software), when executed by the processor 304, causes the processor 304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

As used herein, an element or step recited in the singular and proceeded with the word "a" or "an" should be understood as not excluding plural elements or steps, unless such exclusion is explicitly recited. Furthermore, references to "one embodiment" are not intended to be interpreted as excluding the existence of additional embodiments that also incorporate the recited features.

The various embodiments or components described above, for example, the alarm panel, the central monitoring station, the computing device, and the components or processors therein, may be implemented as part of one or more computer systems. Such a computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system. As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A method for enhancing security of a secured area, comprising:
    receiving, by a processor, a request to access the secured area at an access point associated with the secured area;
    obtaining, by the processor, an image data of a secure boundary area associated with the access point;
    determining, by the processor, a number of users in the secure boundary area based on the image data;
    generating, by the processor, an instruction to disable an operation of an equipment located inside the secured area in response to detecting more than one user in the secure boundary area associated with the access point;
    determining, by the processor, whether to grant an access in response to the request based on one or more rules and an event that overrides the one or more rules at least on a day or a time of day;
    granting, by the processor, the access in response to the request in accordance with the one or more rules and the event that overrides the one or more rules, and when the number of users in the secure boundary area is less than or equal to a threshold; and
    denying, by the processor, the access in response to the request in accordance with the one or more rules and the event that overrides the one or more rules, and when the number of users in the secure boundary area is greater than the threshold.

2. The method of claim 1, wherein a value of the threshold is equal to one.

3. The method of claim 1, wherein determining whether to grant the access further comprises:
    verifying, by the processor, an identity of a user making the request using a verification technique;
    granting the access further upon a successful verification; and
    denying the access further upon an unsuccessful verification.

4. The method of claim 1, wherein determining the number of users further comprises using a video analytics technique.

5. The method of claim 1, wherein determining the number of users in the secure boundary area comprises using a biometric verification technique.

6. The method of claim 1, wherein determining whether to grant the access when the number of users in the secure boundary area is greater than the threshold is further based on an exception request received at a security control system and a grant of the exception request.

7. The method of claim 1, further comprising:
    generating a warning for output at the access point responsive to granting the access when the number of users present in the secure boundary area is greater than the threshold.

8. The method of claim 1, further comprising:
verifying each user in the secure boundary area using a verification technique, wherein the verification technique comprises a biometric technique;
determining to grant the access further upon a successful verification of each user in the secure boundary area; and
determining to deny the access further upon an unsuccessful verification of at least one user in the secure boundary area.

9. The method of claim 1, wherein denying the access further comprises:
outputting an indication at the access point with a reason for denial on a display device at the access point.

10. The method of claim 1, wherein the secured area comprises one of:
a first building;
an area inside a second building;
an ATM (automated teller machine) housing;
a first enclosure for a site; or
a second enclosure for the equipment.

11. A computer device for enhancing security of a secured area, comprising:
a memory;
a processor in communication with the memory;
a communication unit in communication with at least one of the processor or the memory; and
at least a video input device in communication with the communication unit;
wherein the processor is configured to:
receive a request to access the secured area at an access point associated with the secured area;
obtain an image data of a secure boundary area associated with the access point;
determine a number of users in the secure boundary area based on the image data;
generate, by the processor, an instruction to disable an operation of an equipment located inside the secured area in response to detecting more than one user in the secure boundary area associated with the access point;
determine whether to grant an access in response to the request based on one or more rules and an event that overrides the one or more rules at least on a day or a time of day;
grant the access in response to the request in accordance with the one or more rules and the event that overrides the one or more rules, and when the number of users in the secure boundary area is less than or equal to a threshold; and
deny the access in response to the request in accordance with the one or more rules and the event that overrides the one or more rules, and when the number of users in the secure boundary area is greater than the threshold.

12. The computer device of claim 11, wherein a threshold value is equal to one.

13. The computer device of claim 11, wherein in order to determine whether to grant the access, the processor is configured to:
verify an identity of a user making the request using a verification technique;
grant the access further upon a successful verification; and
deny the access further upon an unsuccessful verification.

14. The computer device of claim 11, wherein the processor is configured to determine whether to grant the access when the number of users in the secure boundary area is greater than the threshold further based on an exception request received at a security control system and a grant of the exception request.

15. The computer device of claim 11, wherein the processor is configured to:
generate a warning for output at the access point responsive to granting the access when the number of users present in the secure boundary area is greater than the threshold.

16. The computer device of claim 11, wherein the processor is further configured to:
verify each user in the secure boundary area using a verification technique, wherein the verification technique comprises a biometric technique;
determine to grant the access further upon a successful verification of each user in the secure boundary area; and
determine to deny the access further upon an unsuccessful verification of at least one user in the secure boundary area.

17. The computer device of claim 11, wherein the processor is further configured to:
output an indication at the access point with a reason for denial on a display device at the access point responsive to denying the access.

18. The computer device of claim 11, wherein the secured area comprises one of:
a first building;
an area inside a second building;
an ATM (automated teller machine) housing;
a first enclosure for a site; or
a second enclosure for the equipment.

19. A non-transitory computer readable medium storing computer-executable instructions for enhancing security of a secured area that, wherein the computer-executable instructions, when executed by a processor, cause the processor to:
receive a request to access the secured area at an access point associated with the secured area;
obtain an image data of a secure boundary area associated with the access point;
determine a number of users in the secure boundary area based on the image data;
generate an instruction to disable an operation of an equipment located inside the secured area in response to detecting more than one user in the secure boundary area associated with the access point;
determine whether to grant an access in response to the request based on one or more rules and an event that overrides the one or more rules at least on a day or a time of day;
grant the access in response to the request in accordance with the one or more rules and the event that overrides the one or more rules, and when the number of users in the secure boundary area is less than or equal to a threshold; and
deny the access in response to the request in accordance with the one or more rules and the event that overrides the one or more rules, and when the number of users in the secure boundary area is greater than the threshold.

20. A method for enhancing security of a secured area, comprising:
receiving, by a processor, a request of a user to access the secured area at an access point associated with the secured area;
obtaining, by the processor, an image data of a secure boundary area associated with the access point;

determining, by the processor, a number of users in the secure boundary area based on the image data;

determining, by the processor, whether to grant an access in response to the request based on one or more rules;

granting, by the processor, the access in response to the request in accordance with the one or more rules and when:

the user is an overriding user and is successfully verified;

the request is made on a day or time of day of a public event;

the number of users in the secure boundary area is equal to one and the user is successfully verified; or the number of users in the secure boundary area is more than one and each user in the secure boundary area is successfully verified;

denying, by the processor, the access otherwise; and generating, by the processor, an instruction to disable an operation of an equipment located inside the secured area in response to determining that the number of users in the secure boundary area is greater than one.

* * * * *